United States Patent Office 3,136,819
Patented June 9, 1964

3,136,819
PREPARATION OF TERTIARY ALIPHATIC
METHYL AMINES
Sydney H. Shapiro and Frank Pilch, Chicago, Ill., assignors, by mesne assignments, to Armour & Company, Chicago, Ill., a corporation of Delaware
No Drawing. Filed May 16, 1958, Ser. No. 735,699
13 Claims. (Cl. 260—583)

This invention relates to an improved method for the preparation of tertiary aliphatic methyl amines.

Tertiary aliphatic methyl amines are exceptionally versatile compounds, finding applicability in such diverse areas as corrosion inhibitors, fuel oil additives, bactericides, fungicides, pigment grinding, ore flotation, and as intermediates in the preparation of a hose of other chemicals, such as quaternary ammonium compounds. Although this versatility has been known for a long time, full realization of the potential of tertiary aliphatic methyl amines has never been experienced, primarily because of an unfavorable price picture. Although this has been due in part to the cost of the raw materials from which tertiary aliphatic methyl amines are manufactured, the principal causal factor has been the lack of commercially acceptable process for their preparation.

There are numerous known methods for the preparation of tertiary aliphatic methyl amines, perhaps the most notable being the reactions between long-chain aliphatic alcohols or halides and methyl amines. The chief objection to these methods is the high cost of the starting alcohol or halides. Counterparts to these methods are the reactions between long-chain primary and secondary amines and methanol or methyl halide. In the case of methanol the long reaction periods required and the low yields obtained are objectionable. In the case of methyl halides, it has been impossible to control the production of undesirable by-products, principally quarternary ammonium compounds. Still another method described in U.S. Patent No. 2,366,534 to James E. Kirby involves the reaction between long-chain primary and secondary amines with formaldehyde and formic acid, and employing a solvent such as methyl alcohol as a foam controlling agent. Although this method is still practiced, it is not considered economically feasible because of the large excesses of formic acid required and the necessity for recovering the anti-foaming solvent.

There is described in U.S. Patent No. 2,373,705, a process for the preparation of secondary and tertiary amines which, to applicants' knowledge, has never been applied to the preparation of long-chain tertiary aliphatic methyl amines. This method involves the reaction of hydrogen and an aliphatic aldehyde with an aminating agent such as ammonia and amines having an unsubstituted hydrogen atom and involves introducing the aldehyde progressively into the body of aminating agent having a hydrogenation catalyst present therein and maintained in the liquid phase under hydrogen pressure. Although this method appeared promising to applicants as a potential commercial process for the preparation of tertiary aliphatic methyl amines, the results achieved with long-chain primary or secondary amines and formaldehyde were unacceptable in so far as yields and the production of undesirable by-products were concerned. Applicants, however, surprisingly discovered that these difficulties could be substantially overcome by the inclusion in either the amine or the formaldehyde of a very small amount, for example, about 0.5 to about 3% by weight, based on the amine, of a catalyst material which will be discussed more fully hereinafter. Through the use of this expedient applicants have been able to achieve yields of greater than 90% with primary amines, and practically quantitative yields when starting with secondary amines.

It is, therefore, an object of the present invention to provide an improved method for the preparation of tertiary aliphatic methyl amines.

Further and additional objects of the present invention will become apparent from the following description of the invention.

Amines which can be used as starting materials in accordance with the present invention are characterized generally as long-chain aliphatic hydrocarbon substituted primary amines, symmetrical and unsymmetrical secondary amines and diamines which may be represented by the general formulae $R_1NH_2$, $(R_1)_2NH$, $R_1R_2NH$ and $R_1NH(CH_2)_3NH_2$, wherein in each formula $R_1$ and $R_2$ are aliphatic hydrocarbon radicals having from 8 to 22 carbon atoms. Specific examples of such aliphatic hydrocarbon radicals include octyl, decyl, dodecyl, tetradecyl, hexadecyl, octadecyl, octadecenyl, octadecadienyl, octadecatrienyl, eicosyl and docosyl radicals. Also included are the statistical mixtures of the foregoing radicals as they occur in animal and vegetable fats and oils such as tallow, coconut oil, soybean oil, tall oil and the like. The preferred amine starting materials, primarily for economic reasons, are the primary and secondary monoamines which are produced commercially by the hydrogen reduction of nitriles resulting from the ammoniation of the mixed fatty acids produced by the hydrolysis of tallow, coconut oil and soybean oil. These amines are sold commercially under the trademark Armeen with code designations of T, 2T, C, 2C, S and 2S. The T, C and S indicate that the hydrocarbon portion of the compounds are derived from tallow, coconut oil and soybean oil, and the 2 indicates a secondary amine.

Aliphatic diamines which can be employed as starting materials in accordance with the present invention are sold commercially under the trademark Duomeen with the same T, C and S code classifications. These aliphatic diamines are prepared from the corresponding primary mono-amines by the addition thereto of acrylonitrile followed by hydrogen reduction of the nitrile group to a primary amine group. These compounds, thus, contain both primary and secondary amine groups in the molecule. Specific examples of these aliphatic diamines include N-tallow-trimethylene diamine, N-coco-trimethylene diamine and N-soya-trimethylene diamine.

The aldehyde employed in the process of the present invention is formaldehyde which can be in the form of its linear polymer, paraformaldehyde, or in solution with a non-interfering solvent such as methanol. The preferred practice is to employ the formaldehyde as a 55% by weight solution of mixed monomer and polymer in methanol and water. This material is available commercially under the trade name Methyl Formcel.

The most significant feature of the present invention is the catalyst which applicants have found to be particularly effective in overcoming the problem of poor yields and undesirable by-product formation. These catalysts are employed in very small amounts, ranging from about 0.5 to about 3% by weight based on the amount of starting amine material, and can be employed either by addition of the total amount to the amine material which is maintained in the liquid phase, or by progressive addition during the course of the reaction, either alone or in combination with the formaldehyde. These catalysts are weak acids selected from the group consisting of short-chain aliphatic monobasic acids such as acetic, propionic and butyric acid, short-chain aliphatic hydroxy monobasic acids such as lactic acid, dibasic aliphatic acids such as adipic, and aromatic acids such as benzoic. The preferred acid catalyst is glacial acetic acid, and the preferred quantity of catalyst is about 1% by weight based on the amount of starting amine material.

In the process of the present invention the starting amine material, such as primary tallow amine, is passed to a reaction vessel and maintained in the liquid phase at a temperature between about 50 and 175° C., preferably about 110° C. There is added to the amine, either before or after admission to the reaction vessel, a small quantity of a hydrogenation catalyst, for example, from about 0.1 to 1% by weight based on the amine, which can be any suitable hydrogenation catalyst such as Raney nickel, noble metals, or the like. If desired, glacial acetic acid in an amount of about 1% by weight of the amine material, may be added to the amine. It is preferred, however, to add the glacial acetic acid in combination with the Methyl Formcel. The amine material with the hydrogenation catalyst and with or without the acid catalyst is maintained under a hydrogen pressure of at least 25 pounds per square inch gauge. The upper limits of hydrogen pressure will be governed by the ability of the equipment employed to withstand it. However, extremely high pressures are not necessary and the process will operate effectively at a pressure of about 100–250 p.s.i.g. This is well within the normal limitations of conventional equipment.

To the amine material maintained in the liquid phase at the temperatures and pressures described there is progressively added formaldehyde preferably as a 55% by weight solution of monomer and polymer in methanol and water (Methyl Formcel). There is preferably added with the formaldehyde a quantity of a weak acid catalyst, such as glacial acetic acid, in a quantity sufficient to provide about 1% by weight of the total amount of starting amine material. The rate of the reaction will depend upon the rate at which the formaldehyde is added, and may require from about 1 to about 6 hours. In general the reaction can be completed in about 3 hours.

The present invention will be better understood by reference to the following specific examples:

*Example I*

A hydrogenation converter was charged with 10,000 pounds of n-hexadecane nitrile along with 50 pounds of Raney nickel and 50 pounds of Filter Aid. Hydrogen gas was added for approximately two hours while maintaining a temperature between 140 and 160° C. and a hydrogen pressure between 190 and 200 p.s.i.g. The product of this reaction was assayed and found to be 91.3% primary amine and 1.8% secondary amine.

From this crude primary amine 1,000 pounds were removed and to the remaining 9,000 pounds were added 50 pounds of fresh Raney nickel catalyst and Methyl Formcel containing 100 pounds of acetic acid, 1% basis weight of amine. The reaction was allowed to proceed at a temperature of 118° C. and a hydrogen pressure of 175 p.s.i.g. for approximately five hours during which a total of 3960 pounds of Methyl Formcel was added. The reactor was then cooled to 60° C. and the water of reaction along with the methyl alcohol formed was dropped from the supernatant tertiary amine. The yield was 8,600 pounds having an analysis of 84.0% tertiary amine.

*Example II*

An amine starting material was prepared as described in Example I from 10,000 pounds of n-hexadecane nitrile. The product of this reaction assayed 90.0% primary and 5.1% secondary amine. From the crude primary amine 1,000 pounds was removed and to the remaining 9,000 pounds was added 50 pounds of fresh Raney nickel catalyst, and Methyl Formcel containing 100 pounds of acetic acid, 1% basis weight of amine. The reaction was allowed to proceed for approximately 9 hours at a temperature between 115 and 118° C. and at a hydrogen pressure of 200 p.s.i.g. during which a total of 3,960 pounds of Methyl Formcel were added. The reactor was cooled at 60° C. and the water of reaction along with the methyl alcohol formed was dropped from the supernatant tertiary amine. The yield was 10,000 pounds having an analysis 83.6% of tertiary amine.

*Example III*

A one-liter Magnadash autoclave was charged with 500 grams of N-tallow trimethylene diamine and 25 grams of Raney nickel. The analysis of the starting amine was 42% primary amine, 35.4% secondary amine, and 4.8% tertiary amine to give a total amine content of 82.7%. 185 ml. of Methyl Formcel, containing 55% formaldehyde, and 5 grams of acetic acid (1% basis amine), were added continuously over a period of 2½ hours with the reaction proceeding at a temperature of 120° C. and a maximum hydrogen pressure of 150 p.s.i.g. The reactor was cooled as in the previous examples. The final amine analysis was 0.08% primary, 0.08% secondary, and 75.7% tertiary.

Comparative data was obtained by employing the same starting materials, but adding 180 ml. Methyl Formcel, without the acid catalyst, continuously as above. The reaction required 5 hours to complete and proceeded at a temperature of 120° C. and a maximum hydrogen pressure of 150 p.s.i.g. The analysis of the starting amine was 42.5% primary, 35.4% secondary, and 4.8% tertiary. The analysis of the final amine was 0.96% primary, 3.5% secondary, and 64.4% tertiary.

Employing the same starting material, comparative data was obtained as follows using formic acid: To 392 parts of N-tallow trimethylene diamine, 100 parts each of methyl alcohol and water were added followed by 214 parts of 90% formic acid. While maintaining a temperature not in excess of 65° C. 239 parts of 37% formaldehyde were gradually added to the mixture. The reaction was allowed to proceed for between 3 and 4 hours at 65° C. The free fatty acid was then neutralized with caustic followed by washing with water and drying. The analysis of the product was 1.2% primary, 4.0% secondary and 54.5% tertiary.

*Example IV*

A one-liter Magnadash autoclave was charged with 500 grams of n-octadecylamine and 25 grams of Raney nickel. A total of 141.5 grams (97 mole percent) of Methyl Formcel along with 2.5 grams of glacial acetic acid (0.5% basis amine) were added continuously to the reactor. The reaction was allowed to proceed for approximately 6 hours at a temperature of 120° C. and a maximum hydrogen pressure of 150 p.s.i.g. The analysis of the starting amine was 96.5% primary and 2.2% secondary. The analysis of the final amine was 0.0% primary, 0.7% secondary, and 88.5% tertiary.

Comparative data was obtained by continuously adding to the same starting materials 105 mole percent of Methyl Formcel. No acid catalyst was employed. The reaction proceeded for approximately 4 hours at a temperature of 135° C. and a maximum hydrogen pressure of 150 p.s.i.g. The analysis of the starting amine was 96.5% primary, and 2.2% secondary. The analysis of the final amine was 1.0% primary, 0.0% secondary, and 74.3% tertiary.

*Example V*

Employing the same starting material as in Example IV, and under like conditions of time, temperature, and pressure, 98 mole percent of Methyl Formcel along with 5 grams (1% basis amine) of propionic acid were added. The analysis of the starting amine was 96.5% primary, 2.2% secondary. The analysis of the final amine was 0.1% primary, 1.1% secondary and 86.4% tertiary.

*Example VI*

Again employing the same starting material as in Example IV, and under like conditions of time, temperature, and pressure, 96 mole percent of Methyl Formcel along with 5 grams (1% basis amine) of lactic acid were added. The analysis of the starting amine was the same as in Examples IV and V. The analysis of the final amine was 0.0% primary, 1.1% secondary, and 83.0% tertiary.

Example VII

Proceeding as set forth in Example IV but using 96 mole percent of Methyl Formcel along with 5 grams (1% basis amine) of adipic acid, the final amine analysis was 1.1% primary, 1.4% secondary, and 84.4% tertiary.

Example VIII

Again proceeding as in Example IV but employing 100 mole percent of Methyl Formcel with 5 grams of benzoic acid, the final amine analysis was 0.2% primary, 0.7% secondary and 88.0% tertiary.

Example IX

A hydrogenation converter was charged with 9,600 lbs. of a secondary amine derived from hydrogenated tallow fatty acids comprising approximately 24% hexadecyl, 75% octadecyl and 1% octadecenyl. To this starting material were added 1 gallon of acetic acid and 86 lbs. of Raney nickel catalyst. During an 8 hour period, and at a temperature of 120 to 140° C. and a hydrogen pressure of 200 p.s.i.g., a total of 1,160 lbs. of Methyl Formcel were added continuously. At the end of this period the reactor was cooled to 60° C. and the alcohol and water formed, together with the nickel catalyst was dropped. The product was dried and filtered. The yield was 9,700 lbs. having a final analysis of 0.7% primary amine, 0.6% secondary amine, and 99.6% tertiary amine.

While this invention has been described and exemplified in terms of its preferred embodiments, those skilled in the art will appreciate that modifications can be made without departing from the spirit and scope of the invention.

We claim:

1. In a process for the preparation of tertiary aliphatic methyl amines wherein formaldehyde is progressively added to an amine, maintained in the liquid phase under hydrogen pressure at reaction temperature and pressure, selected from the group consisting of amines having the formulae $R_1NH_2$, $(R_1)_2NH$, $R_1R_2NH$ and $$R_1NH(CH_2)_3NH_2$$

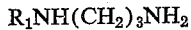

wherein $R_1$ and $R_2$ represent aliphatic hydrocarbon radicals having from 8 to 22 carbon atoms, said amine containing a hydrogenation catalyst, the improvement which consists of employing as an additional catalyst for the reaction, from about 0.5 to about 3 weight percent based on the amine of an acid selected from the group consisting of short-chain aliphatic monobasic carboxy, hydroxy monobasic carboxy and dibasic carboxy acids, said monobasic acids and hydroxy monobasic acids having at least two carbon atoms and said dibasic acids having at least three carbon atoms, and benzoic acid.

2. In a process for the preparation of tertiary aliphatic methyl amines wherein formaldehyde is progressively added to an amine, maintained in the liquid phase under hydrogen pressure at reaction temperature and pressure, having the formula $R_1NH_2$, wherein $R_1$ is an aliphatic hydrocarbon radical having from 8 to 22 carbon atoms, said amine containing a hydrogenation catalyst, the improvement which consists of employing as an additional catalyst for the reaction from about 0.5 to about 3 weight percent based on the amine of an acid selected from the group consisting of short-chain aliphatic monobasic carboxy, hydroxy monobasic carboxy and dibasic carboxy acids, said monobasic and hydroxy monobasic acids having at least two carbon atoms and said dibasic acids having at least three carbon atoms, and benzoic acid.

3. In a process for the preparation of a tertiary aliphatic methyl amine wherein formaldehyde is progressively added to an amine, maintained under hydrogen pressure in a liquid phase at reaction temperature and pressure, having the formulae $(R_1)_2NH$ wherein $R_1$ is an aliphatic hydrocarbon radical having from 8 to 22 carbon atoms, said amine containing a hydrogenation catalyst, the improvement which consists of employing as an additional catalyst for the reaction, from about 0.5 to about 3 weight percent based on the amine, of an acid selected from the group consisting of short-chain aliphatic monobasic carboxy, hydroxy monobasic carboxy and dibasic carboxy acids, said monobasic and hydroxy monobasic acids having at least two carbon atoms and said dibasic acids having at least three carbon atoms, and benzoic acid.

4. In a process for the preparation of tertiary aliphatic methyl amines wherein formaldehyde is progressively added to an amine, maintained under hydrogen pressure in the liquid phase at reaction temperature and pressure, having the formula $R_1NH(CH_2)_3NH_2$, wherein $R_1$ is an aliphatic hydrocarbon radical having from 8 to 22 carbon atoms, said amine containing a hydrogenation catalyst, the improvement which consists of employing as an additional catalyst for the reaction, from about 0.5 to about 3 weight percent based on the amine, of an acid selected from the group consisting of short-chain aliphatic monobasic carboxy, hydroxy monobasic carboxy and dibasic carboxy acids, said monobasic and hydroxy monobasic acids having at least two carbon atoms and said dibasic acids having at least three carbon atoms, and benzoic acid.

5. In a process for the preparation of tertiary aliphatic methyl amines wherein formaldehyde is progressively added to an amine, maintained under hydrogen pressure in a liquid phase at reaction temperature and pressure, having the formula $R_1NH_2$, wherein $R_1$ is an aliphatic hydrocarbon radical having from 8 to 22 carbon atoms, said amine containing a hydrogenation catalyst, the improvement which consists of adding in combination with the formaldehyde about 1% of glacial acetic acid, based on the amount of amine.

6. In a process for the preparation of tertiary aliphatic methyl amines wherein formaldehyde is progressively added to an amine, maintained under hydrogen pressure in the liquid phase at reaction temperature and pressure, having the formula $(R_1)_2NH$ wherein $R_1$ is an aliphatic hydrocarbon radical having from 8 to 22 carbon atoms, said amine containing a hydrogenation catalyst, the improvement which consists of adding in combination with the formaldehyde about 1% by weight of glacial acetic acid based on the amount of amine.

7. A process for the preparation of tertiary aliphatic methyl amines which comprises passing to a reaction vessel an amine selected from the group consisting of amines having the formulae $R_1NH_2$, $(R_1)_2NH$, $R_1R_2NH$ and $R_1NH(CH_2)_3NH_2$, wherein $R_1$ and $R_2$ represent aliphatic hydrocarbon radicals having from 8 to 22 carbon atoms, maintaining said amines in the liquid phase at a temperature of from about 50 to about 175° C. and under a hydrogen pressure of at least 25 pounds per square inch gauge in the presence of a hydrogenation catalyst, and progressively adding to the amines under the conditions so maintained a combination of formaldehyde and from about 0.5 to about 3 weight percent, based on the amount of amine, of an acid catalyst selected from the group consisting of monobasic carboxy, hydroxy monobasic carboxy and dibasic carboxy acids, said monobasic and hydroxy monobasic acids having at least two carbon atoms and said dibasic acids having at least three carbon atoms, and benzoic acid.

8. A process according to claim 7 wherein the starting amine employed is an aliphatic amine having the formula $R_1NH_2$, wherein $R_1$ is an aliphatic hydrocarbon radical having from 8 to 22 carbon atoms.

9. A process according to claim 7 wherein the aliphatic amine employed has the formula $R_1R_2NH$, wherein $R_1$ and $R_2$ are aliphatic hydrocarbon radicals having from 8 to 22 carbon atoms.

10. A process according to claim 7 wherein the amine employed has the formula $R_1NH(CH_2)_3NH_2$, wherein $R_1$ is an aliphatic hydrocarbon radical having from 8 to 22 carbon atoms.

11. A process according to claim 7 wherein the aliphatic amine employed has the formula $(R_1)_2NH$.

12. In a process for the preparation of a tertiary aliphatic methyl amine wherein formaldehyde is progressively added to an amine, maintained under hydrogen pressure in a liquid phase at reaction temperature and pressure, having the formula $R_1R_2NH$ wherein $R_1$ and $R_2$ are aliphatic hydrocarbon radicals having from 8 to 22 carbon atoms, said amine containing a hydrogenation catalyst, the improvement which consists of employing as an additional catalyst for the reaction, from about 0.5 to about 3 weight percent based on the amine, of an acid selected from the group consisting of short-chain aliphatic monobasic carboxy, hydroxy monobasic carboxy and dibasic carboxy acids, said monobasic and hydroxy monobasic acids having at least two carbon atoms and said dibasic acids having at least three carbon atoms, and benzoic acid.

13. In a process for the preparation of tertiary aliphatic methyl amines wherein formaldehyde is progressively added to an amine, maintained under hydrogen pressure in the liquid phase at reaction temperature and pressure, having the formula $R_1R_2NH$ wherein $R_1$ and $R_2$ are aliphatic hydrocarbon radicals having from 8 to 22 carbon atoms, said amine containing a hydrogenation catalyst, the improvement which consists of adding in combination with the formaldehyde about 1% by weight of glacial acetic acid based on the amount of amine.

References Cited in the file of this patent
UNITED STATES PATENTS 2,373,705   Olin et al. _____ Apr. 17, 1945

FOREIGN PATENTS 436,414   Great Britain _____ Oct. 10, 1935
464,856   Canada _____ May 2, 1950

OTHER REFERENCES

Clarke et al.: J. Am. Chem. Soc., vol. 55, pages 4571–87 (1933).